United States Patent
Goodman et al.

(10) Patent No.: US 7,272,081 B2
(45) Date of Patent: Sep. 18, 2007

(54) ON-DEMAND SUPPORT FOR RESOURCES IN AN AUTOMATED DATA STORAGE LIBRARY

(75) Inventors: Brian G. Goodman, Tucson, AZ (US); Leonard G. Jesionowski, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 719 days.

(21) Appl. No.: 10/811,552

(22) Filed: Mar. 29, 2004

(65) Prior Publication Data
US 2005/0213440 A1 Sep. 29, 2005

(51) Int. Cl.
*G11B 7/085* (2006.01)
(52) U.S. Cl. .............. 369/30.27; 369/30.39; 700/218
(58) Field of Classification Search ......... 369/30.38, 369/30.39, 30.06, 30.08, 30.09, 30.03, 30.28, 369/30.29, 30.31, 30.53, 30.68; 700/216–218, 700/3, 101; 707/204; 711/114, 170; 713/189, 713/168
See application file for complete search history.

(56) References Cited

U.S. PATENT DOCUMENTS

| | | | |
|---|---|---|---|
| 5,357,562 A | 10/1994 | Metser et al. | |
| 5,528,758 A | 6/1996 | Yeh | |
| 5,991,402 A | 11/1999 | Jia et al. | |
| 6,105,042 A | 8/2000 | Aganovic et al. | |
| 6,356,803 B1 * | 3/2002 | Goodman et al. | 700/218 |
| 6,442,162 B1 | 8/2002 | O'Neill et al. | |
| 6,452,924 B1 | 9/2002 | Golden et al. | |
| 6,529,996 B1 | 3/2003 | Nguyen et al. | |
| 6,560,618 B1 | 5/2003 | Ims | |
| 6,597,956 B1 | 7/2003 | Aziz et al. | |

* cited by examiner

*Primary Examiner*—Ali Neyzari
(74) *Attorney, Agent, or Firm*—Dan Shifrin

(57) ABSTRACT

Methods, system and computer program product are provided for managing and tracking on-demand removable, serialized data resources, such as storage frames, storage drives and media, in an automated data storage library. Storage frames, data storage drives and media are tracked by the automated data storage library to prevent use or misappropriation until authorized. Alternatively, or additionally, the data storage drives may be prevented from being used until instructed to do so. In addition, the media may be prevented from being used until modification is made to the medium or cartridge memory of the data storage media.

25 Claims, 6 Drawing Sheets

ON-DEMAND SUPPORT FOR RESOURCES IN AN AUTOMATED DATA STORAGE LIBRARY

TECHNICAL FIELD

This invention relates to automated data storage libraries, and more particularly, to managing and tracking on-demand resources, such as storage shelves, drives and media, in an automated data storage library.

BACKGROUND ART

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media". Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, MEMS based storage, Compactflash™, Smartmedia™, Memory Stick™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain data storage drives that store data to, and/or retrieve data from, the data storage media. The transport of data storage media between data storage shelves and data storage drives is typically accomplished by one or more robot accessors (hereinafter termed "accessors"). Such accessors have grippers for physically retrieving the selected data storage media from the storage shelves within the automated data storage library and transport such media to the data storage drives by moving in the X and Y directions.

It is often desirable to allow for expansion of an automated data storage library by including additional storage shelves, additional data storage drives and additional accessors. As an example, an IBM® 3584 UltraScalable Tape Library is scaleable from a single frame to sixteen frames. Each frame may comprise from one to twelve data storage drives and may comprise enough storage slots to hold more than four hundred data storage media cartridges.

When it is desired to expand the capabilities of an automated data storage library, a service or repair technician is typically called to install additional hardware, such as library frames and drives. The installation of additional library frames is usually disruptive because the library must be taken out of service while the new frames are installed, aligned and calibrated.

Some libraries offer additional storage slots on-demand to reduce the impact of installing additional library frames. This involves the sale and installation of more library frames than the customer initially intends to use. For example, the customer may only need a single library frame and pays full price for this frame. In addition, the customer receives a second library frame and pays something less than full price for the convenience of being able to use the second frame at a later time, on-demand. The library will prevent access to the storage slots in the second frame until the customer has completed an on-demand upgrade. The upgrade costs additional money and may be purchased through a telephone order, through an Internet web order, etc. In addition, the upgrade may be based on the honor system with the expectation that the customer will notify the manufacturer or distributor that the upgrade has been utilized. The upgrade may comprise a license key or a menu selection that is entered at an operator panel or web user interface.

While the installation of additional data storage drives is less disruptive than library frames and storage slots, there may be a delay between the requirement for an additional drive and the actual installation and operation of the drive. This is because the drive must be ordered, shipped, received, unpacked, installed and calibrated before it can be used. Therefore, there is a need to provide on-demand data storage drives in an automated data storage library.

While the installation of additional data storage media is less disruptive than the installation of additional library frames, storage slots or data storage drives, there may again be a delay between the requirement for additional data storage media and having the data storage media available for use. This is because the media must be ordered, shipped, received, unpacked, labeled and installed before it can be used. Therefore, there is a need to provide on-demand data storage media in an automated data storage library.

Library frames and storage slots are not easily moved and misappropriated by a customer because they usually involve installation and alignment by a service or repair technician. This has allowed on-demand solutions for storage slots and library frames that are fairly easy to implement. In order to reduce installation, warranty and repair costs, library systems are moving toward a model called Customer Setup Unit (CSU) and another model called Customer Replaceable Unit (CRU). Library manufacturers are motivated to design their products with these operating models in mind. The result is lower manufacturing overhead because customers can perform their own warranty work, and more competitive products because the customer doesn't have to pay someone to install an upgrade. A disadvantage of such operating models is that on-demand hardware solutions are easily circumvented when customers can perform their own hardware upgrades and repairs. For example, data storage drives may be easy to move around the library, or to move from one library to another. If a customer experienced a failure with one drive, he could replace it with an on-demand drive without even paying for it.

Therefore, there is a need to provide a method for tracking or controlling on-demand data storage drives to prevent them from being used prior to receipt or intent of payment. In another example, data storage media is very easy to move around the library, or to move from one library to another. If a customer experienced a failure with one data storage cartridge, he could replace it with an on-demand cartridge without even paying for it. Therefore, there is a need to provide a method for tracking or controlling on-demand data storage media to prevent them from being used prior to receipt or intent of payment. In yet another example, as storage frames become easier to install as part of the CSU and CRU direction, a customer could take an on-demand storage frame and move it to another library. Therefore, there is a need to provide a method for tracking or controlling on-demand storage frames to prevent them from being used prior to receipt or intent of payment.

SUMMARY OF THE INVENTION

The present invention provides methods, system and computer program product for managing and tracking on-demand removable, serialized data resources, such as storage frames, drives and media, in an automated data storage library. When a customer acquires a library, more frames and/or drives and/or media cartridges than will be initially used may be installed. Those resources which are actually used are paid for, although the customer may also pay some amount for the remaining on-demand resources. At such time as the customer's needs change, some or all of the remaining (unused) resources may be brought on-line for an additional payment.

Data storage frames and/or drives and/or media may be tracked by the automated data storage library to prevent unauthorized use. Alternatively, or additionally, the data storage drives may be prevented from being used until instructed to do so. The media may also be prevented from being used until modification is made to the medium or cartridge memory of the data storage media.

Consequently, customers may pay only for the resources they currently need, installation of additional resources is quick, and vendors have assurance that resources which are used are actually paid for.

DETAILED DESCRIPTION OF THE PREFERRED EMBODIMENT

The invention will be described as embodied in an automated magnetic tape library storage system for use in a data processing environment. However, one skilled in the art will recognize the invention equally applies to optical disk cartridges or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
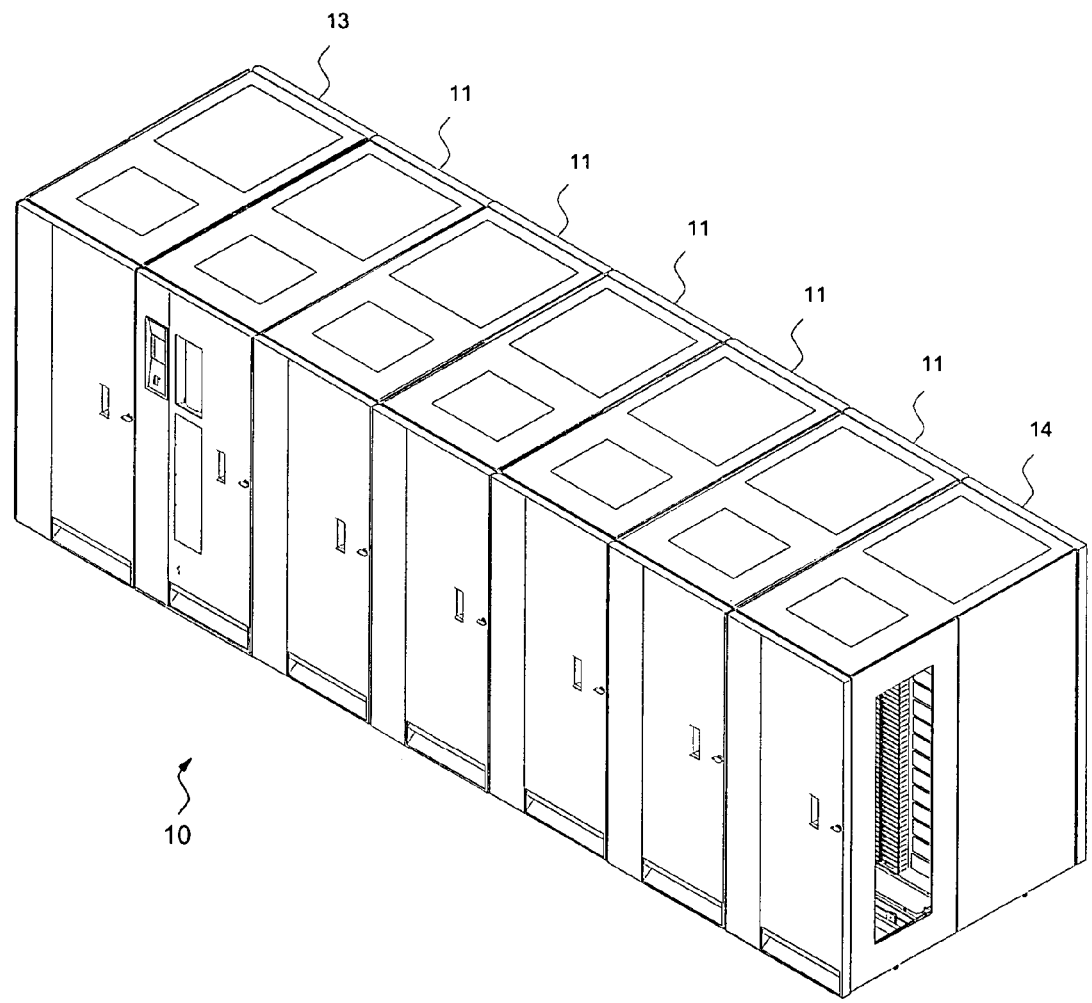
FIG. 1 is an isometric view of an automated data storage library adaptable to implement embodiments of the present invention, with the view specifically depicting a library having a left hand service bay, multiple storage frames and a right hand service bay.
Figure 2:
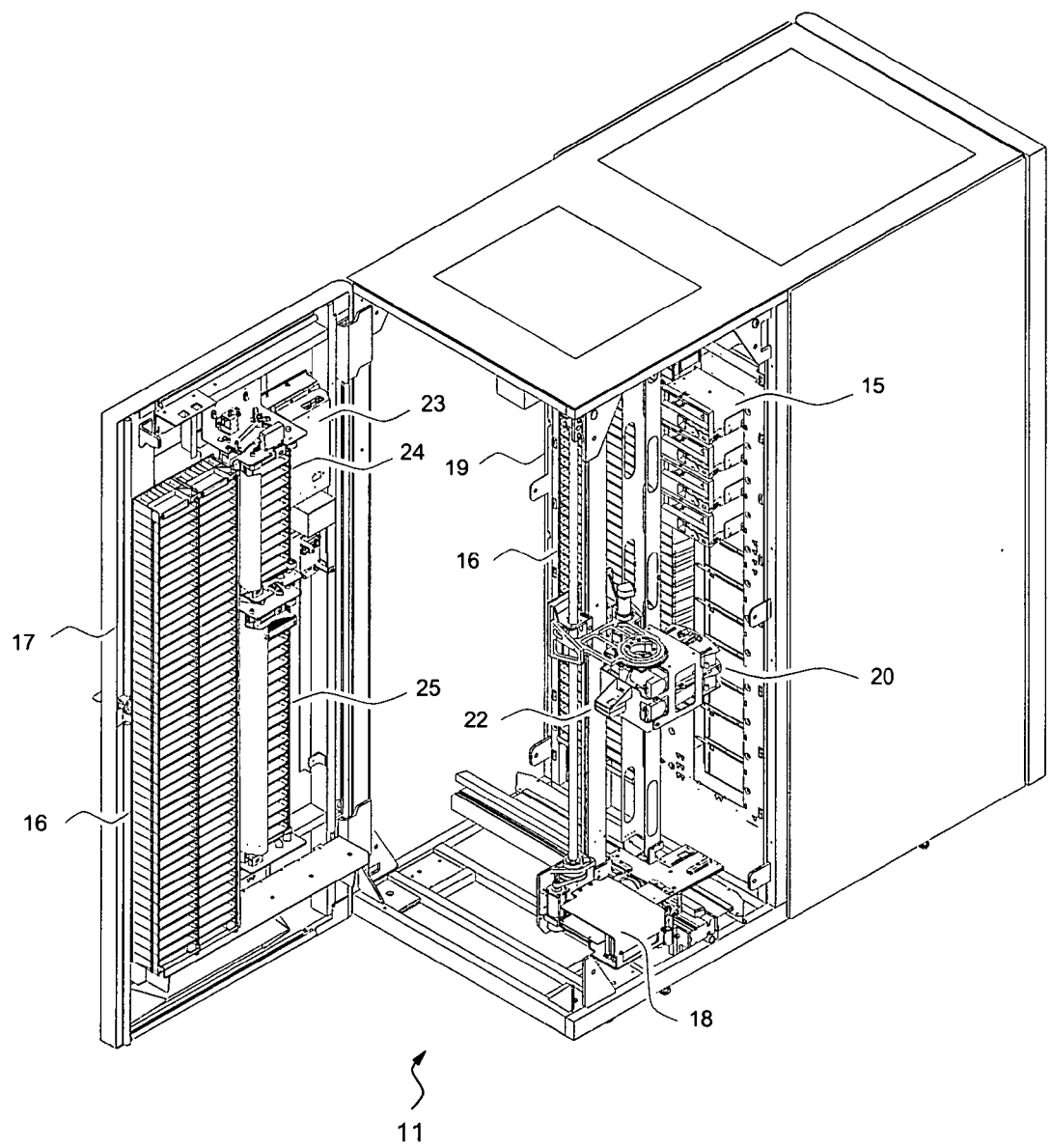
FIG. 2 is an isometric view of an automated data storage library adaptable to implement embodiments of the present invention, with the view specifically depicting an exemplary basic configuration of the internal components of a library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer generally to both data storage cartridges and the media contained within, and for purposes herein the two terms are used interchangeably. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may include additional storage shelves, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage shelves 16 on front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. The library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20 to "read" identifying information about the data storage media.

Figure 3:
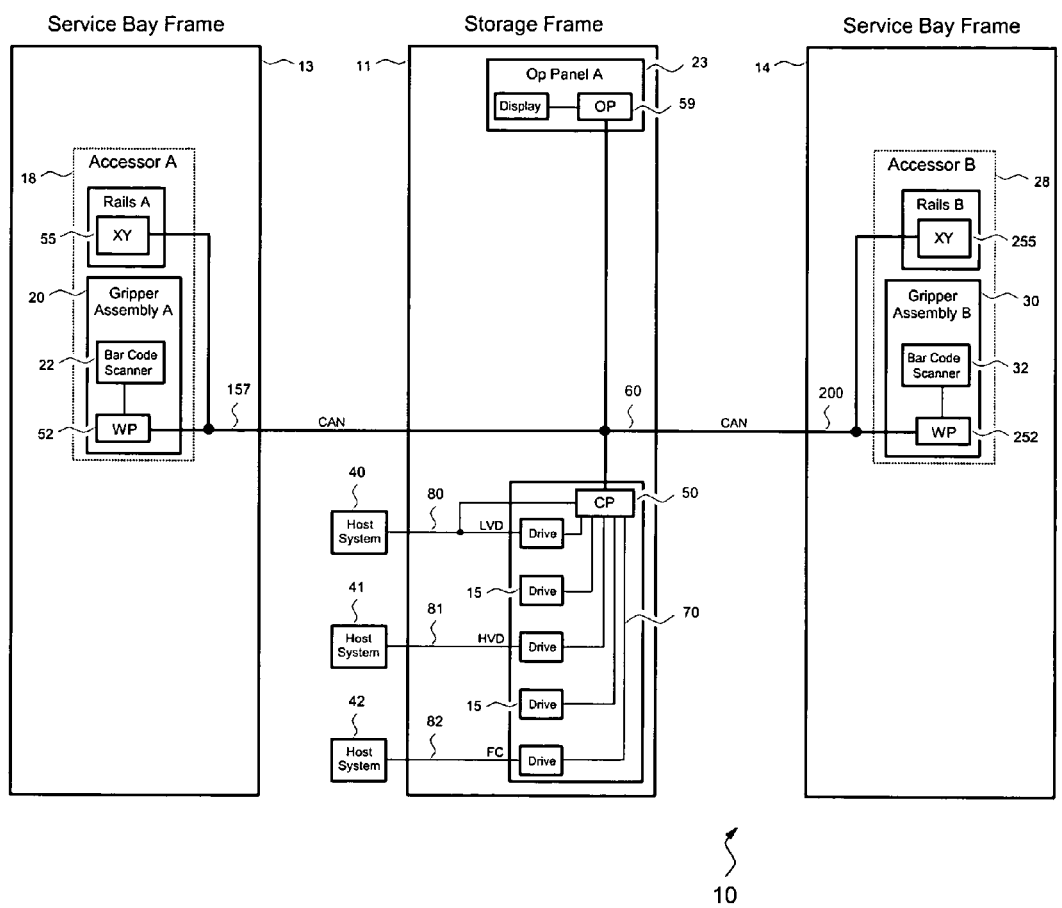
FIG. 3 is a block diagram of an automated data storage library adaptable to implement embodiments of the present invention, with the diagram specifically depicting a library that employs a distributed system of modules with a plurality of processor nodes.

FIG. 3 illustrates an embodiment of an automated data storage library 10 of FIGS. 1 and 2 which employs a distributed system of modules with a plurality of processor nodes. An example of an automated data storage library which may implement the distributed system depicted in the block diagram of FIG. 3, and which may implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein for reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Further, networks 157, 60 and 200 may comprise a single network or may comprise multiple independent networks. Depending on the design of the library, it may not be necessary to have a left hand service bay 13 and/or a right hand service bay 14.

Figure 4:
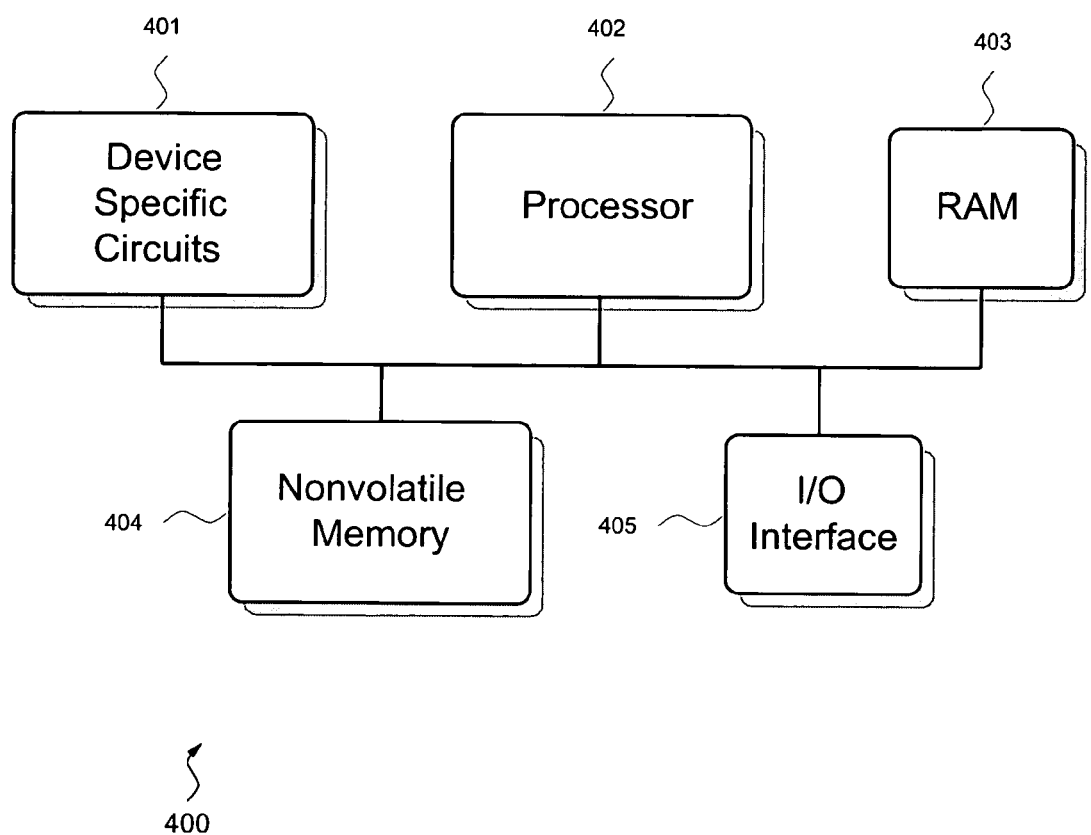
FIG. 4 is a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), MRAM (Magnetoresistive Random Access Memory), MEMS (Micro ElectroMechanical Systems) based storage, battery backup RAM, and hard disk drives. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus) or SCSI (Small Computer Systems Interface). The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

Figure 5:
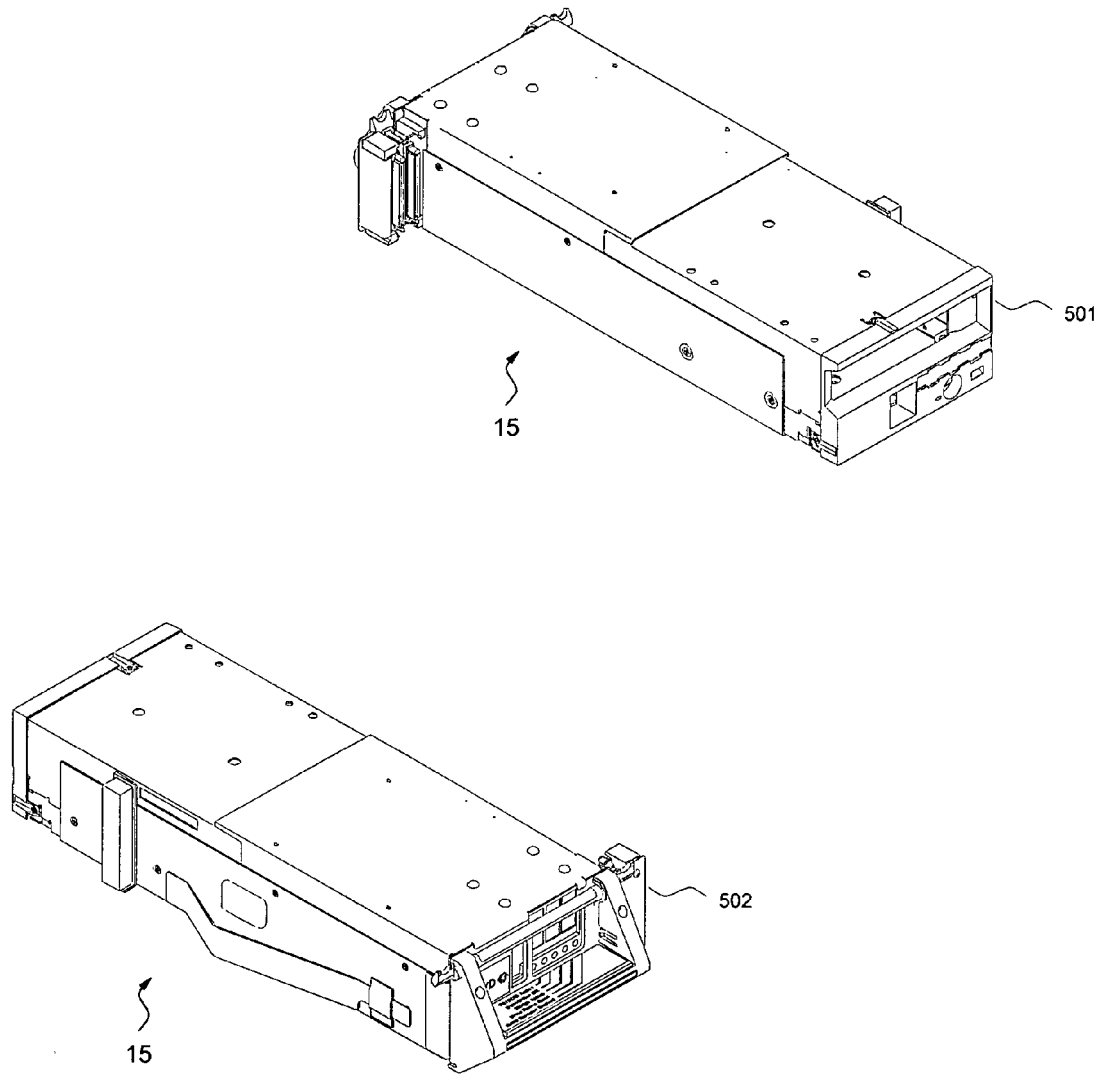
FIG. 5 is an isometric view of the front and rear of a data storage drive adaptable to implement embodiments of the present invention.

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6:
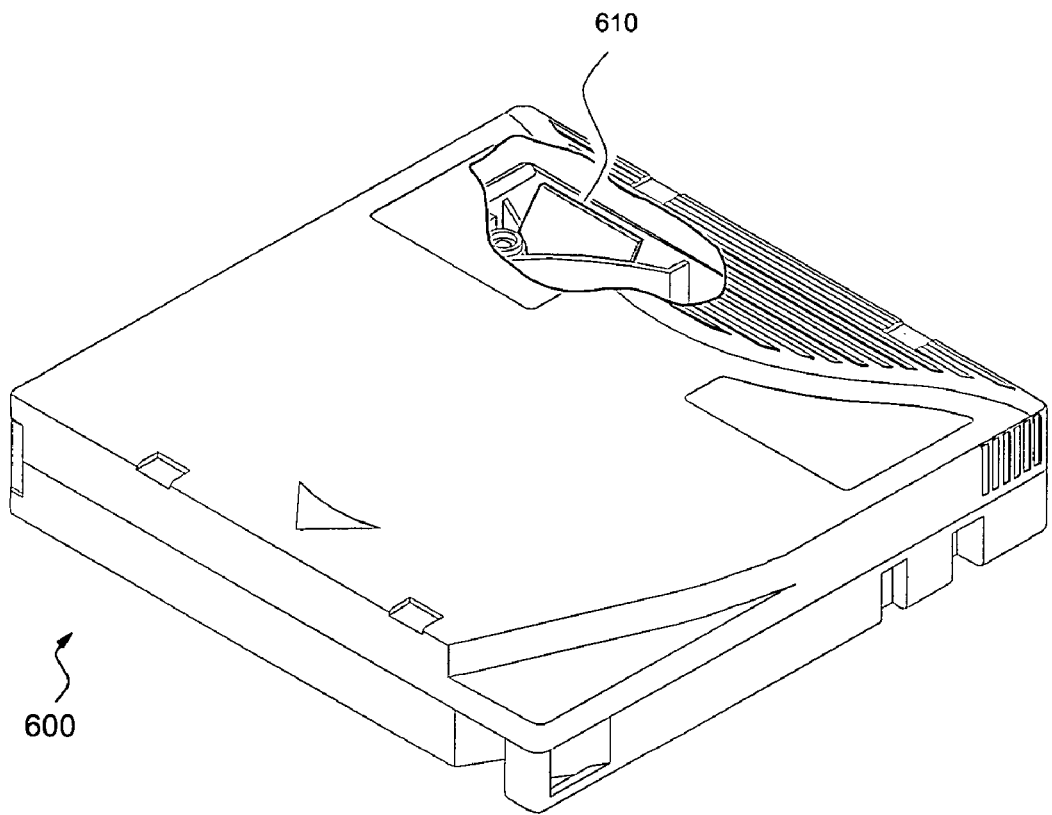
FIG. 6 is an isometric view of a data storage cartridge adaptable to implement embodiments of the present invention.

FIG. 6 illustrates an embodiment of an LTO (Linear Tape Open) data storage cartridge 600 with a cartridge memory 610 shown in a cutaway portion of the Figure. This is only an example and is not meant to limit the invention to any particular type of cartridge memory device. In fact, any configuration of data storage cartridge may be used whether or not it comprises a cartridge memory. If present, the cartridge memory may comprise electrical contacts to provide communication between the cartridge memory and the data storage drive and/or between the cartridge memory and a reader/writer in the library. Alternatively, the cartridge memory may comprise wireless communication using induction, RF (Radio Frequency), Infrared or other optical communications, or any other method of wireless communication as is known to those of skill in the art. In a preferred embodiment, the cartridge memory comprises the well known RFID tag.

Automated data storage libraries are often used to back up critical data. If the automated data storage library encounters operational problems then it is crucial to quickly provide service and repair. A feature often referred to as "Call-Home" is used to expedite service and repair of an automated data storage library. Call-home is a feature used by the library to call a service or repair center when it detects an operational error. Another feature, called "Heartbeat Call-Home" involves a periodic call to a service or repair center as a watchdog function. If the automated data storage library doesn't call at some periodic interval then it may be an indication that there is a problem with the automated data storage library. The interface between a product that provides the call-home capability and a service or repair facility may comprise telephone lines, the Internet, an intranet, a wireless link such as RF or infrared, dedicated communication lines such as Fibre Channel or ISDN, or any other means of interfacing two remote devices as is known to those of skill in the art. The call-home communication protocol may comprise SNMP (Simple Network Management Protocol), HTTP (Hyper Text Transfer Protocol), FTP (File Transfer Protocol), Telnet, SMTP (Simple Mail Transfer Protocol), PPP (Point to Point Protocol), a proprietary protocol, or any other means of communicating between two remote devices as is known to those of skill in the art. In addition, the automated data storage library may comprise communication to another product that actually provides the interface to the service or repair facility. For example, the library may comprise an Ethernet connection to a server and the server may provide the connection to a call-home facility. It should be noted that there is no implied limitation in the name "Call-Home". "Call-Home" refers to a communication that may be initiated at either end. The communication may comprise a one-way communication, a two-way communication, a multi-way communication, a broadcast, or combinations thereof.

The present invention simplifies the management and tracking of removable, on-demand, serialized resources. Herein, removable, serialized resources refer to resources that are easily removable and/or installable, and may be identified by unique information to distinguish one resource from another resource. These resources include, without limitation, storage frames, drives and media. A storage frame comprises a housing or enclosure that contains a plurality of storage shelves for holding data storage media. A drive comprises any device capable of reading and/or writing data to/from removable storage media. Media comprises any storage medium that is designed with appropriate packaging to be handled by human and/or by machine, and is capable of being read from and/or written to by more than one drive. Such resources may either be configured for operation (enabled or usable in normal read/write operations by the customer) or configured to be non-operational (disabled or unusable in normal read/write operations by the customer).

In a first embodiment of the invention, data storage drives are provided on-demand as a business practice. The drives may be provided at a nominal fee to help pay for the actual cost of the drive. Alternatively, the drives may be provided at no cost or at a substantial cost, compared to the actual retail price of the drive. When a customer requires an on-demand drive, the library may be upgraded by activating, enabling or configuring for operation on-demand resources that were previously not available for use by the customer.

In a second embodiment of the invention, data storage cartridges are provided on-demand as a business practice. Herein, data storage media, data storage cartridge, storage media, storage cartridge, media and cartridge all refer to removable media that is read and/or written by a data storage drive of an automated data storage library. The media may be provided at a nominal fee to help pay for the actual cost of the media. Alternatively, the media may be provided at no cost or at a substantial cost, compared to the actual retail price of the media. When a customer requires on-demand media, the library may be upgraded by activating, enabling, providing access to configure, or otherwise configuring for operation on-demand media that was previously not available for use by the customer.

In one variation of the first and second embodiments, the upgrade comprises a telephone call to order the upgrade. The customer may pay for the upgrade using a credit card, purchase order, billing through the mail, or any other method of monetary transaction as is known by those of skill in the art. The customer may receive an upgrade key, license key, firmware update image or any other method of authenticating an upgrade as is known to those of skill in the art. For example, a license key may comprise a unique set of numbers that are unique to a particular upgrade on a particular library. Entering the correct numbers on a library user interface may result in the library providing the upgrade to the customer.

In another variation of the first and second embodiments, the upgrade comprises an order placed on the Internet. A web ordering system may be used to take orders and to process the upgrade request. The customer may pay for the upgrade using a credit card, purchase order, billing through the mail, or any other method of monetary transaction as is known by those of skill in the art. The customer may receive an upgrade key, license key, or any other method of authenticating an upgrade as is known to those of skill in the art.

In still another variation of the first and second embodiments, the upgrade comprises an honor system or an automatic billing system where the customer is not required to make any payment or initial registration when the upgrade is made. In this embodiment, there may not be an upgrade key, license key, etc. Instead, there may be an operator option, such as a menu selection on a web user interface or operator panel, to activate the upgrade. Alternatively, the upgrade may be activated by high demand or high utilization of library resources. In this case, the library, a host computer, or some other remote computer may activate the upgrade automatically.

In a third embodiment, on-demand storage frames are tracked to ensure that they are not misappropriated or so that billing may be established after they have begun to be used. The storage frames are tracked using unique frame information such as, but not limited to, a frame serial number. The unique frame information may be obtained electronically from a frame controller or other electronic device associated with the frame, or it may be obtained through a wireless system such as a bar code label, RFID tag, etc. Preferably, the unique frame information is obtained from a bar code label.

In a fourth embodiment of the invention, on-demand drives are tracked to ensure that they are not misappropriated or so that billing can be established after they have been used. The drives are tracked using unique drive information such as, but not limited to, a drive serial number. The unique drive information may be obtained electronically from the drive using a communication interface between the library and drive, such as through lines 70 of FIG. 3. Alternatively, the unique drive information may be obtained through a wireless system such as a bar code label, RFID tag, etc. The unique drive information is preferably obtained electronically from the drive or obtained from a bar code label, RFID tag or other wireless machine readable device.

In a fifth embodiment of the invention, on-demand media is tracked to ensure that it is not misappropriated or so that billing can be established after it has been used. The media is tracked using unique media information such as, but not limited to, a cartridge serial number. The unique media information may comprise information stored in a cartridge memory such as, but not limited to, the cartridge memory 610 of an LTO (Linear Tape Open) cartridge 600 (FIG. 6). The unique media information may alternatively comprise information stored on the medium of the data storage media. In the example of a tape cartridge, the unique media information would be stored on the magnetic tape. A machine readable indicator such as, but not limited to, a bar code label, may also be used to store the unique media information. Such an indicator is especially useful with tamper resistant labeling systems, such as the electronic cartridge label of co-pending and commonly assigned U.S. patent application Ser. No. 10/649,095, filed Aug. 26, 2003, entitled "Electronically Updateable Labeling System For Data Storage" which has been incorporated herein for reference.

In a variation of the third, fourth and fifth embodiments, a call-home function is used to authorize an upgrade and/or to report that on-demand storage frames, drives or media are missing. The unique storage frame, drive or media information may be transmitted to a receiving location during an automated "Call-Home" or "Heartbeat Call-Home". For example, on-demand hardware that is tracked by the library and subsequently shows up missing, could result in a call-home to alert a library supplier that on-demand hardware may have been misappropriated. This information may be used to dispatch service personnel, establish contact with the customer, provide billing, etc. In another example, an on-demand upgrade could result in a call-home to alert a library supplier that an upgrade has been requested or installed. This information may be used to provide billing and/or as a trigger to enable an upgrade in the library. A Heartbeat Call-Home function could be used as a safeguard to prevent someone from disabling the Call-Home functionality. For example, someone may disable Call-Home to prevent the billing or reporting of an on-demand upgrade. Heartbeat Call-Home would solve this problem because a missing periodic call-home could result in further investigation as to why the call-home feature is not working. The library may call-home to the library manufacturer, an agent of the manufacturer, a service or repair facility, a sales office, a business partner, or any other entity responsible for tracking or management of the on-demand resources. The library may establish the call-home communication using any interface and protocol known to those of skill in the art, including proprietary interfaces and protocols. As one example, the library may use a modem and telephone lines to contact a sales office. In another example, the library may send email over the Internet. Still further, the library may use a cellular telephone network.

In another variation of the third, fourth and fifth embodiments, part or all of the library functionality is disabled when on-demand storage frames, drives or media are missing. For example, on-demand hardware that is tracked by the library and subsequently shows up missing, could indicate that on-demand hardware may have been misappropriated. The library may disable part or all of its functionality as a counter measure to the missing hardware. Disabling library functionality may comprise reporting information about the missing hardware on a user interface, reporting one or more error conditions, failing one or more library commands from a host computer, failing one or more library commands from a user interface, etc. The library may cancel any disabling action after some or all of the missing resources have been accounted for. The resources may be accounted for by the library. For example, the library may discover a resource that was previously missing. Or the resources may be accounted for through an interface to the library. For example, there may be provision to override the library disabling function through a user interface of the library, through a call-home facility, through a host interface, through a diagnostic interface or through some other interface of the library.

In a sixth embodiment of the invention, the on-demand drives are configured to be non-operational or otherwise restricted from being used without prior authorization.

In one variation of the sixth embodiment, the library provides the restriction by keeping track of which drives are authorized to be used in the library. This may comprise a list containing unique drive information such as, but not limited to, a drive serial number. If a particular drive is not in the list, then the library would not allow the drive to be used. This may comprise a lack of reporting that the drive exists to a host computer and/or at an operator interface to the library. Alternatively, this may comprise the inability to configure the drive in the library. Still further, this may comprise the reporting of a library error when an attempt is made to have the library move media to/from the drive. An on-demand upgrade would result in the list being updated with unique information about the on-demand drive that is to be enabled for use in the library. One skilled in the art will appreciate that instead of providing the restriction based on which drives are authorized in the library, the library may provide the restriction by keeping track of which drives are not authorized to be used in the library. This list would comprise unique drive information for the on-demand drives that have not yet been authorized to be used in the library. An on-demand upgrade would result in an item being removed from the list that corresponds to the on-demand drive being authorized. In addition, this embodiment may comprise a combination of the two lists.

In another embodiment, the drive is actually disabled from use until it has been authorized as an on-demand upgrade. The library may instruct the drive to disable itself or the drive may be disabled at or before installation.

When an upgrade has been authorized, the library would instruct the drive to enable or configure itself for normal operation. The disable/enable instructions may occur over any communication interface between the library and drive. Alternatively, a host computer or some other computer associated with the drive or library may provide the instructions to enable and/or disable the drive. The instructions may comprise a simple command or may comprise a more complicated communication involving a firmware update, encryption/decryption keys, or other secure methods of communication as are known to those of skill in the art.

In a seventh embodiment of the invention, on-demand cartridges are configured to be non-operational or otherwise restricted from being used without prior authorization In one variation of the seventh embodiment, the library provides the restriction by keeping track of which cartridges are authorized to be used in the library. This may comprise a list containing unique information for each on-demand cartridge such as, but not limited to, a cartridge serial number, a cartridge memory serial number, a cartridge bar code label, etc. If a particular cartridge is not in the list, then the library will not allow the cartridge to be used. An on-demand upgrade would result in the list being updated with unique information about the on-demand cartridge to be enabled for use in the library. One skilled in the art will appreciate that instead of providing the restriction based on which cartridges are authorized in the library, the library may provide the restriction by keeping track of which cartridges are not authorized to be used in the library. This list would comprise unique cartridge information for the on-demand cartridges that have not yet been authorized to be used in the library. An on-demand upgrade would result in an item being removed from the list that corresponds to the on-demand cartridge being authorized. In addition, this embodiment may comprise a combination of the two lists.

In another embodiment, the cartridge is actually disabled from use until it has been authorized as an on-demand upgrade. The cartridge may be disabled by modifying the cartridge in such a way that the cartridge cannot be read and/or written by a drive. The cartridge may be disabled by modifying the contents of the data storage medium within the cartridge. For example, a record or field of the medium may be modified to prevent a drive from reading and/or writing data in the cartridge. The cartridge may be disabled by modifying the contents of a cartridge memory. For example, the LTO (Linear Tape Open) data cartridge contains a cartridge memory. The cartridge memory contains a field that describes the media type of the cartridge. This field may be set to a value that is unsupported by a drive. As a result, the drive would not allow the cartridge to be read from or written to. The library may instruct a drive to disable a cartridge by modifying the contents of the medium and/or the cartridge memory, or the library may disable the cartridge through some other means such as, but not limited to, a cartridge memory writer in the library. Alternatively, the cartridge may be disabled at or before installation of the cartridge in the library.

When an upgrade has been authorized, the library may enable (configure for operation) the medium and/or cartridge memory. This may be done with a cartridge memory writer within the library, a media writer within the library, etc. Alternatively, the library may instruct a drive to enable the medium or cartridge memory. This may be done with a cartridge memory writer within the drive, a media writer within the drive, etc. If the library is instructing the drive to enable or disable the medium and/or cartridge memory then the instructions may comprise commands and may be communicated on any communication interface between the library and drive, such as through lines 70 of FIG. 3. Alternatively, a host computer or some other computer associated with the drive or library may provide the instructions to enable or disable the cartridge. The instructions may comprise commands and may be communicated on any communication interface between the computer and the library or drive. The corrections may comprise erasing or writing of unmodified data or they may comprise manipulated data involving encryption/decryption keys or other secure methods of modifying data as is known to those of skill in the art.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for managing on-demand resources in an automated storage library, comprising:
    configuring a library with a plurality of removable serialized resources;
    configuring at least one of the removable serialized resources for operation;
    disabling operation of the remaining removable serialized resources;
    restricting configuration access to the non-operational serialized resources;
    initiating a request to make at least one of the non-operational serialized resource operational; and
    in response to the request, providing configuration access to the at least one non-operational serialized resource whereby the at least one non-operational serialized resource is configurable for operation.

2. The method of claim 1, wherein:
    configuring at least one of the removable serialized resources for operation comprises generating a list of removable serialized resources authorized to be used by the customer; and
    providing configuration access to the at least one of the remaining removable serialized resources comprises adding the at least one of the remaining removable serialized resources to the list.

3. The method of claim 1, wherein:
    configuring at least one of the removable serialized resources for operation comprises generating a list of removable serialized resources not authorized to be used by the customer; and
    providing configuration access to the at least one of the remaining removable serialized resources comprises removing the at least one of the remaining resources from the list.

4. The method of claim 1, wherein the plurality of removable serialized resources comprise data storage frames.

5. The method of claim 1, wherein:
    the plurality of removable serialized resources comprise data storage drives; and
    configuring at least one of the removable serialized resources for operation comprises configuring a first plurality of data storage drives to permit read/write access to data storage media.

6. The method of claim 5, wherein:
    the plurality of removable serialized resources comprise data storage drives; and
    disabling operation of the remaining removable serialized comprises configuring the remaining data storage drives to prevent read/write access to data storage media.

7. The method of claim 1, wherein:
    the plurality of removable serialized resources comprise a plurality of data storage cartridges;
    configuring at least one of the removable serialized resources for operation comprises configuring a first plurality of data storage cartridges to permit read/write access; and
    disabling operation of the remaining removable serialized comprises configuring remaining data storage cartridges to prevent read/write access.

8. The method of claim 7, wherein configuring the remaining data storage cartridges to prevent read/write access comprises modifying contents of a cartridge memory.

9. The method of claim 7, wherein configuring the remaining data storage cartridges to prevent read/write access comprises modifying contents of storage media within the data storage cartridges.

10. The method of claim 1, further comprising implementing a call-home function if the customer requests the use of at least one of the remaining resources.

11. The method of claim 1, further comprising implementing a heartbeat call-home function to determine if any of the at least one remaining resources is in use or missing without authorization.

12. A data storage library, comprising:
    a plurality of removable serialized resources;
    at least one data storage frame comprising a plurality of storage shelves for holding data storage cartridges;
    at least one data storage drive for receiving a data storage cartridge and writing/reading data to/from media within the cartridge;
    an accessor for transporting data storage cartridges between storage shelves and the at least one data storage drive; and
    a processor programmed to execute instructions for:
        configuring at least one of the removable serialized resources for operation;
        disabling operation of the remaining removable serialized resources;
        restricting configuration access to the non-operational serialized resources;
        initiating a request to make at least one of the non-operational serialized resources operational; and
        in response to the request, providing configuration access to the at least one non-operational serialized resource whereby the at least one non-operational serialized resource is configurable for operation.

13. The data storage library of claim 12, wherein:
    the instructions for configuring at least one of the removable serialized resources for operation comprise instructions for generating a list of resources authorized to be used by the customer; and
    the instructions for providing configuration access to the at least one of the remaining removable serialized resources comprise instructions for adding the at least one of the remaining removable serialized resources to the list.

14. The data storage library of claim 12, wherein:
    the instructions for configuring at least one of the removable serialized resources comprise instructions for generating a list of removable serialized resources not authorized to be used by the customer; and
    the instructions for providing configuration access to the at least one of the remaining removable serialized resources comprise instructions for removing the at least one of the remaining removable serialized resources from the list.

15. The data storage library of claim 12, wherein the processor is further programmed with instructions for implementing a call-home function if the customer requests the use of at least one of the remaining removable serialized resources.

16. The data storage library of claim 12, wherein the processor is further programmed with instructions for implementing a heartbeat call-home function to determine if any of the at least one remaining removable serialized resources is in use or missing without authorization.

17. The data storage library of claim 12, wherein the removable serialized resources comprise at least one of the data storage frame, the data storage cartridges or the at least one data storage drive.

18. The data storage library of claim 12, wherein:
the plurality of removable serialized resources comprise the data storage cartridges;
the instructions for configuring at least one of the removable serialized resources comprise instructions for configuring a first plurality of data storage cartridges to permit read/write access; and
the instructions for disabling operation of the remaining removable serialized comprise instructions for configuring remaining data storage cartridges to prevent read/write access.

19. The data storage library of claim 12, wherein:
the plurality of removable serialized resources comprise the data storage cartridges; and
the instructions for configuring the remaining data storage cartridges to prevent read/write access comprise instructions for modifying contents of a cartridge memory.

20. The data storage library of claim 12, wherein:
the plurality of removable serialized resources comprise the data storage cartridges; and
the instructions for configuring the remaining data storage cartridges to prevent read/write access comprise instructions for modifying contents of storage media within the data storage cartridge.

21. A computer program product of a computer readable medium usable with a programmable computer, the computer program product having computer-readable code embodied therein for managing on-demand resources in an automated storage library, the computer-readable code comprising instructions for:
configuring a library with a plurality of removable serialized resources;
configuring at least one of the removable serialized resources for operation;
disabling operation of the remaining removable serialized resources;
restricting configuration access to the non-operational serialized resources;
initiating a request to make at least one of the non-operational serialized resource operational; and
in response to the request, providing configuration access to the at least one non-operational serialized resource whereby the at least one non-operational serialized resource is configurable for operation.

22. The computer program product of claim 21, wherein:
the instructions for configuring at least one of the removable serialized resources for operation comprise instructions for generating a list of removable serialized resources authorized to be used by the customer; and
the instructions for providing configuration access to the at least one of the remaining removable serialized resources comprise instructions for adding the at least one of the remaining removable serialized resources to the list.

23. The computer program product of claim 21, wherein:
the instructions for configuring at least one of the removable serialized resources comprise instructions for generating a list of removable serialized resources not authorized to be used by the customer; and
the instructions for providing configuration access to the at least one of the remaining removable serialized resources comprise instructions for removing the at least one of the remaining resources from the list.

24. The computer program product of claim 21, wherein the computer-readable code further comprises instructions for implementing a call-home function if the customer requests the use of at least one of the remaining removable serialized resources.

25. The computer program product of claim 21, wherein the computer-readable code further comprises instructions for implementing a heartbeat call-home function to determine if any of the at least one remaining removable serialized resources is in use or missing without authorization.

* * * * *